United States Patent [19]

Teich

[11] 4,323,820
[45] Apr. 6, 1982

[54] EMERGENCY LIGHTING SYSTEM
[75] Inventor: Rudor M. Teich, South Orange, N.J.
[73] Assignee: Foxmar Industries Inc., New York, N.Y.
[21] Appl. No.: 134,650
[22] Filed: Mar. 27, 1980
[51] Int. Cl.³ .............................................. H02J 9/00
[52] U.S. Cl. ...................................... 315/86; 307/66; 315/174
[58] Field of Search ................ 315/86, 172, 174, 225; 307/66, 73; 362/20

[56] References Cited
U.S. PATENT DOCUMENTS 3,771,012 11/1973 Niederjohn ......................... 315/86
3,801,794 4/1974 Mauch et al. ....................... 307/66
4,056,757 11/1977 Mauch et al. ...................... 315/86

FOREIGN PATENT DOCUMENTS 1434773 5/1976 United Kingdom .................. 315/86

Primary Examiner—Eugene R. La Roche
Attorney, Agent, or Firm—Gottlieb, Rackman & Reisman

[57] ABSTRACT

There is disclosed an emergency lighting system which is capable of distinguishing between a loss of power due to the opening of a line switch, and a loss of power resulting from a line failure when the switch is closed. A secondary power source powers the light in the event of a line failure. Thus when the line switch is open, i.e., when emergency lighting is not necessary, the light is not powered by the secondary source.

48 Claims, 3 Drawing Figures

EMERGENCY LIGHTING SYSTEM

This invention relates to systems for controlling the operation of emergency devices in the presence of a power line failure, and more particularly to a system for controlling the powering of an emergency light in the presence of a line failure but not when the line switch is open.

There are many devices which are provided with battery back-ups so as to enable their operations in the event of a power line failure. Emergency generators used in hospitals and telephone central offices are just one example. Another common example is that of emergency lights, a case which presents unusual problems— especially when fluorescent lamps are employed.

In a typical lighting system, many light fixtures are coupled to the same power line, with all of them being controlled by a single wall switch. In the event of a power line failure, it is desirable to have at least one of the lights remain operative, and toward this end a secondary power source is provided in the fixture which is to function as the emergency light. When power is lost on the line, the secondary power source assumes control and ensures that at least one light on the line will remain energized. In many applications, the emergency light is an "exit" sign, although there is a growing recognition that one or more ceiling fixtures on a power line in commercial and manufacturing installations should be provided with an emergency power source so that in the event of a power failure sufficient light is made available for egress purposes.

The basic problem with prior art systems is that they are incapable of distinguishing between a power line failure (e.g., the opening of a circuit breaker or a black-out condition) and the turning off of the wall switch which controls power on the line. At the end of the day, when the last person leaves an office and turns off the wall switch, usually there is no need for any lighting. But the circuitry in the emergency-light fixture which detects a loss of power and connects the secondary power source to the light cannot distinguish between a true power loss condition and a wall switch which has been turned off; in both cases, there is no power on the line at the fixture, and the emergency battery is connected across the light to maintain it on.

The obvious shortcoming of such a system is that energy is wasted; the light remains on even when it is not needed and the emergency battery is thus depleted. When the wall switch is turned on the following day, the battery is re-charged by a charger provided in the fixture for this purpose, but the energy cost of repeatedly charging and discharging the battery is considerable. But perhaps a more serious problem is that, because the secondary power source is used when emergency lighting is not really necessary, it may be in a discharged state when it is next needed. It can take around ten hours to re-charge a battery which is depleted overnight. Thus for all practical purposes, the emergency lighting system is left in a state in which it cannot fulfill its intended purpose at the beginning of the next day when the wall switch is turned on.

In the case of an exit sign, for example, if the sign is connected to the same line which powers the ordinary lights and the wall switch controlling this line is turned off at night, the exit sign will be powered by the secondary power source until the following morning. When power is restored with the closing of the wall switch, the battery will start to re-charge, but if there is now a black-out the battery will be incapable of turning on the exit sign. For this reason, what is often done is to power the exit sign from a separate power line. The wall switch for this line is kept closed continuously so that the battery comes into play only in the case of a true power line failure. Even if energy cost considerations are ignored, the cost of installing a separate power line just for the exit sign can be substantial. But there has been no practical alternative, since to place the exit sign on the same line with the ordinary lights will result in the loss of power to the exit sign when the wall switch is open. The problem is even more severe in a retro-fit situation where it is desired to provide some of the lamp fixtures with emergency power sources. In this case, running separate power lines to these fixtures can entail even greater installation costs; it is usually more expensive to add a line to a finished installation than it is to provide an additional line at a construction site.

It is a general object of my invention to provide a system for controlling the operation of an emergency device which is capable of distinguishing between a true power line failure and the opening of a wall switch, so as to power the device from a secondary power source only in the case of a true power line failure.

If the emergency device to be controlled is a fluorescent lamp, then there is an additional complication. Suppose that a detection mechanism is provided in the fixture for distinguishing between a true power line failure and the opening of a wall switch. This detection mechanism connects the secondary power source across the lamp only when there is a true power line failure. Unless special provisions are made, a second or so may elapse between the power line failure and the connection of the emergency battery across the lamp. This is due to the fact that a valid decision as to the cause of the loss of power on the line at the fixture cannot even be made until after the line transients have dissipated. In such a case, the lamp would turn off when power disappears from the line, and turn on again a second or so later when a decision is made that there is a true power line failure as opposed to a wall switch having been opened. But a fluorescent lamp requires much more power for turn-on than it does for sustained operation. Thus a larger battery has to be provided than that which would suffice were it only a question of sustaining the fluorescent lamp, as opposed to actually starting its operation all over again.

It is another object of my invention to provide an emergency lighting system for a fluorescent lamp which requires a secondary power source having a capacity sufficient only to sustain lamp illumination, without requiring a capacity sufficient to initiate lamp operation—despite the fact that several seconds may elapse between the time that power disappears from the line and a decision is made as to the need for emergency lighting.

Briefly, in accordance with the principles of my invention, detection circuitry is provided with the emergency lighting system for distinguishing between a loss of power at the fixture which results from a true line failure and a loss of power at the fixture which results from turning off of the wall switch. The battery is used to power the detection circuit, and a condition is caused to exist on the line which is different for the two loss-of-power situations.

In the illustrative embodiment of the invention, as soon as a loss of power is detected, the secondary power source is operated. A DC-to-AC converter converts the DC battery potential to a high-frequency AC signal which is applied across the fluorescent lamp to maintain its ionization and light. This same signal is necessarily extended to the power line since the power line is connected across the lamp via the AC ballast. An impedance is connected across the power line on the side of the wall switch which is remote from the fixture. The detection circuit is also connected across the line, but on the side of the wall switch which is opposite to that side connected to the impedance. Depending upon whether the switch is open or closed, a different magnitude high-frequency AC signal is detected on the line. If the switch is open, a high-level signal is detected. On the other hand, if the switch is closed the line is shorted by the impedance so that the detected signal is much lower in magnitude, the level ratio varying by as much as 100:1. In this manner, the detection circuit is capable of determining whether the wall switch is open or closed. Only if the wall switch is closed does the battery continue to power the lamp. If the wall switch is open, power to the lamp from the secondary power source is cut off.

Immediately upon the detection of a loss of power, the battery is connected across the lamp so that the lamp stays on. Approximately one second later, after the line transients have died down, the circuit functions to determine the line condition. It is only then that the battery is disconnected from the lamp if the wall switch is open. In this manner, a low-capacity battery can be utilized because the battery is not needed to actually start the lamp. The system assumes that continued operation will be required and the battery immediately takes over powering of the lamp when line power disappears. It is only about a second later that the battery is disconnected if it is determined that emergency lighting is not necessary.

The decision as to whether emergency lighting is necessary is made only once. Once the decision is made to disconnect the battery, the line is no longer monitored. This, in and of itself, can conserve battery power. There is no need to further monitor the line after the initial decision is made. If the decision is made to connect the battery to the lamp, it is disconnected when the detection circuit detects the appearance of line power once again on the line.

Further objects, features and advantages of my invention will become apparent upon consideration of the following detailed description in conjunction with the drawing, in which.

Figure 1:
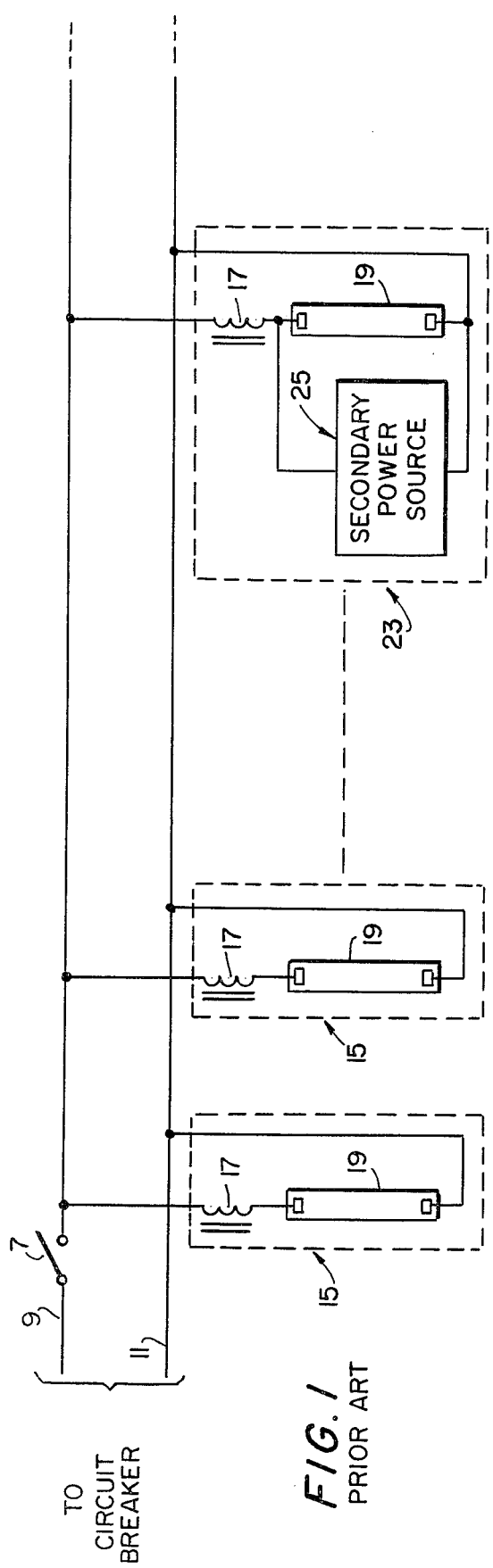
FIG. 1 depicts a prior art emergency lighting system.

In the prior art system of FIG. 1, power line 9, 11 is extended through a circuit breaker (not shown) to a power company line. Switch 7 is the conventional on-/off switch which is typically found on a wall for controlling a bank of lights. The lights depicted in FIG. 1 are of the fluorescent type. Each fixture 15 includes a rapid-start fluorescent lamp 19 which is coupled to the line through a standard ballast 17.

Fixture 23 includes a secondary power source 25 connected directly across the fluorescent lamp. Typically, the power source includes a battery, together with a recharging circuit, and a DC-to-AC converter which converts the DC potential of the battery to an AC signal for powering the lamp. The secondary power source also includes a detector circuit for turning on the converter when a loss of line power is detected.

The problem with the prior art system of FIG. 1 is that if wall switch 7 is opened, the secondary power source 25 will detect a loss of power on line 9, 11 and it will power lamp 19 in fixture 23. If the lamp is powered overnight, by the next morning the battery charge may be depleted such that the battery will be incapable of operating the lamp should a true power failure occur. But there is no apparent way to distinguish between a loss of power due to a true line failure and a loss of power due to the opening of switch 7; in both cases, there is no power on the line and the emergency lighting system comes into operation. It is for this reason that fixture 23 is typically wired separately to a power line that is unswitched.

Figure 2:
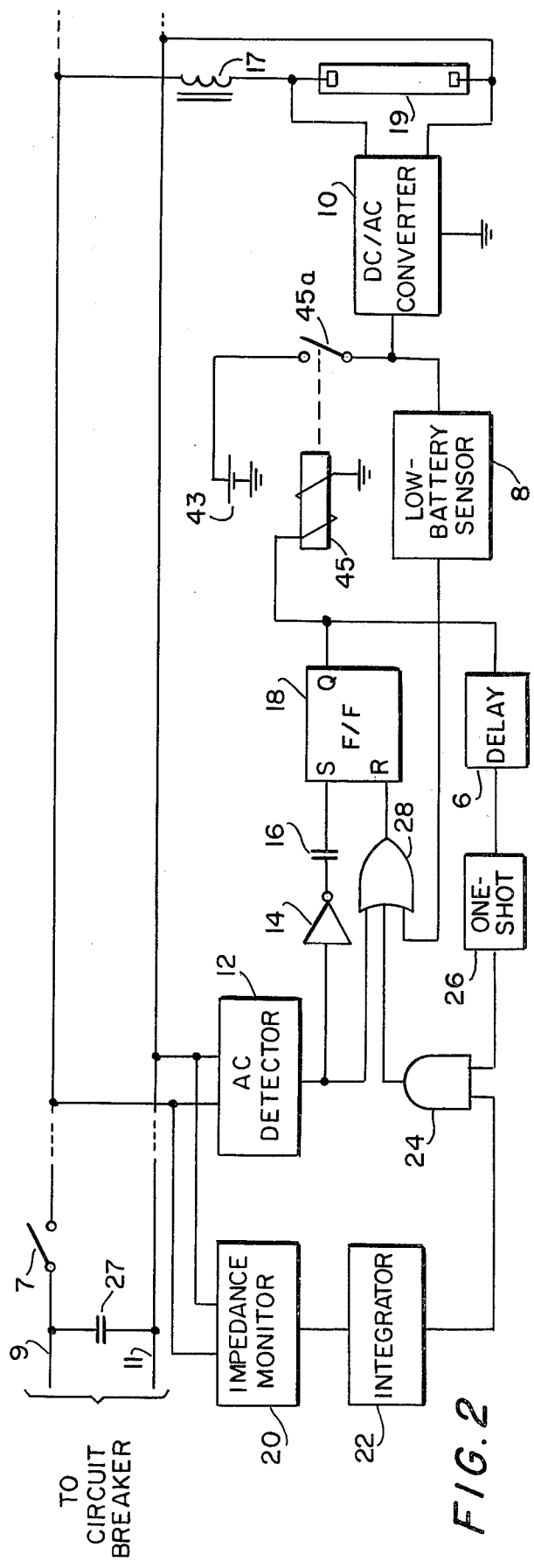
FIG. 2 depicts a block diagram of the illustrative embodiment of my invention.

FIG. 2 depicts a block diagram of the illustrative embodiment of the invention. In this drawing, the conventional fixtures connected to line 9, 11 (such as fixtures 15 in FIG. 1) are not shown. What is shown in FIG. 2, in addition to the power line itself and an additional capacitor 27 whose purpose will be described below, are the elements included in a single emergency lighting fixture.

Fluorescent lamp 19 is connected across the line through ballast 17 in the conventional manner. A DC-to-AC converter 10 is connected across the lamp for powering it, as is known in the art. Power for the converter is derived from battery 43 when relay 45 is energized, contacts 45a closing to connect the battery to the input of the converter.

AC detector 12 is connected across the line and functions to detect whether line power is present (typically, 60 Hz, 110 volts). The output of the detector is high whenever line power is present. As soon as a loss of power on the line is detected, whether it be the result of the opening of switch 7 or a true line failure, the output of AC detector 12 goes low. The output of inverter 14 thus goes high, and a short positive pulse is extended through capacitor 16 to the S input of flip-flop 18. The flip-flop is thus set and its Q output goes high to energize relay 45.

When the Q output of the flip-flop goes high, delay element 6 is triggered. This element has a delay of one second, a time sufficient to allow line transients to dissipate. After the one-second delay, one-shot multivibrator 26 is fired. The period of this multivibrator is one second, so that gate 24 is enabled for only one second, starting after one second has elapsed from the loss of power.

During the one-second delay period, DC-to-AC converter 10 operates to maintain lamp 19 on. The DC-to-AC converter generates a 25-kHz signal (which is just as sufficient for powering the lamp as a 60-Hz signal). This signal is coupled through ballast 17 and the lamp to line 9, 11. Capacitor 27 is placed across line 9, 11 on that side of switch 7 which is remote from the side to which the emergency lighting fixture is connected. If switch 7 is closed, the 25-kHz signal which is applied to line 9, 11 causes current to flow through the switch and the capacitor. At such a high frequency, the capacitor presents a very low impedance. Impedance monitor 20 in effect looks at the impedance of capacitor 27 through switch 7. If a low impedance is detected, it is an indication that switch 7 is closed. On the other hand, if switch 7 is open, then the impedance monitor sees the relatively high impedance presented by ballast 17 (and the other fixtures on the line). In this manner, the impedance monitor can determine whether switch 7 is open or closed.

The impedance monitor can take the form of a simple amplifier, or even a voltage divider. The level of the 25-kHz signal which appears at the input of circuit 20 is high if switch 7 is open, and it is low if the switch is closed. The output of circuit 20 is simply a 25-kHz signal whose magnitude reflects the condition of the switch. Integrator 22 rectifies the signal and derives a DC level proportional to the amplitude of the input 25-kHz signal. If switch 7 is open a high potential appears at the output of the integrator, and if the switch is closed a low potential appears at the output. The detection is highly reliable in that the signal levels may vary by as much as a factor of 100 depending on whether switch 7 is open or closed.

During the one-second interval that multivibrator 26 operates, gate 24 is enabled. If a high potential is applied to the other input of the gate by integrator 20, the output of gate 24 goes high. A signal is extended through OR gate 28 to the R input of flip-flop 18. The flip-flop is reset, as a result of a high-level signal having been detected by the impedance monitor, i.e., as a result of switch 7 being open. As soon as the flip-flop resets, relay 45 de-energizes and lamp 19 turns off. (The reason for providing capacitor 16 is to prevent the S input of the flip-flop from being held high when AC detector 12 detects a loss of power; the capacitor transmits a pulse through it, and then charges so that the S input of the flip-flop goes low. This is necessary in order for the flip-flop to reset should OR gate 28 soon operate.)

On the other hand, if switch 7 is closed, then the output of integrator 22 will be low during the one-second interval that gate 24 is enabled by multivibrator 26. In such a case, the output of gate 24 will be low, and flip-flop 18 will not be reset. Relay 45 remains energized and lamp 19 is held on by DC-to-AC converter 10.

In the case of a true line failure with switch 7 being closed, when the line is restored the output of AC detector 12 goes high once again. A negative pulse now appears at the output of inverter 14 and has no effect on the S input of flip-flop 18. But the positive step at the output of detector 12 which is transmitted through OR gate 28 controls the resetting of the flip-flop and the de-energization of relay 45. Contacts 45a open as there is no longer any need for emergency powering of the lamp.

The third input to OR gate 28 is connected to the output of low battery sensor 8. This device monitors the potential of battery 43. For certain batteries, it is dangerous to deplete the charge of a battery below a certain minimum level and, for this reason, when a low-charge state is detected relay 45 is de-energized. When a low-charge state is detected by sensor 8, its output goes high and causes the flip-flop to reset. Although there will no longer be any emergency lighting, that is better than to deplete the charge to below the safe minimum level.

There are several features of the circuit of FIG. 2 to which particular attention should be given. First, it should be noted that battery 43 is not required to initiate the operation of lamp 19. A reliable determination as to the cause of the line-power loss can be made only after line transients have died down, and it is for this reason that delay 6 is provided. (This is especially true when fluorescent lamps, with their associated ballasts, are being powered.) Were lamp 19 to turn off as soon as line power is lost, it would be necessary for converter 10 to initiate operation of the lamp a second or so later when it is determined that a true line failure has occurred. This would necessitate a larger capacity battery. It is for this reason that relay 45 energizes immediately upon the detection of a loss of power so that battery 43 causes the lamp to remain energized. It is only at the end of the delay period, when a reliable determination as to the cause of the loss of power can be made, that the battery is dis-connected from the converter if switch 7 has been opened as opposed to a true loss of line power. Battery 43 is never required to initiate the lamp operation.

For reliable operation, the lamp should not be turned off by a noise spike. It is for this reason that integrator 22 is provided. It is not simply a single cycle of the 25-kHz signal which is used to control operation of AND gate 24; were this the case, a noise spike could turn on the gate. Instead, the integrator rectifies the signal and integrates it so that only if a continuous signal is present does flip-flop 18 reset.

Equally important insofar as reliability is concerned is that the impedance monitor and/or integrator can be tuned to the frequency of converter 10, 25-kHz in the illustrative embodiment of the invention. Because it is known that the signal which represents the line condition is at a particular frequency, it is only a signal at this frequency which is examined to determine whether switch 7 is open or closed. By limiting the frequencies to which the impedance monitor and/or integrator can respond, there is little danger that noise will result in the resetting of flip-flop 18.

To further guard against erroneous resetting of the flip-flop and turning off of the emergency light, one-shot multivibrator 26 is provided. The multivibrator serves to provide a time "window" in which the line condition is examined. It is only during the one-second period which follows the one-second delay that flip-flop 18 can be reset if a high-level 25-kHz signal is detected. Were the output of integrator 22 to be connected directly to an input of OR gate 28, flip-flop 18 could be reset at any time if, due to the presence of noise, the impedance monitor 20 "sees" a high impedance. By limiting the detection process to a short time interval, there is much less of a chance that the emergency light will be turned off when it should not be.

Figure 3:
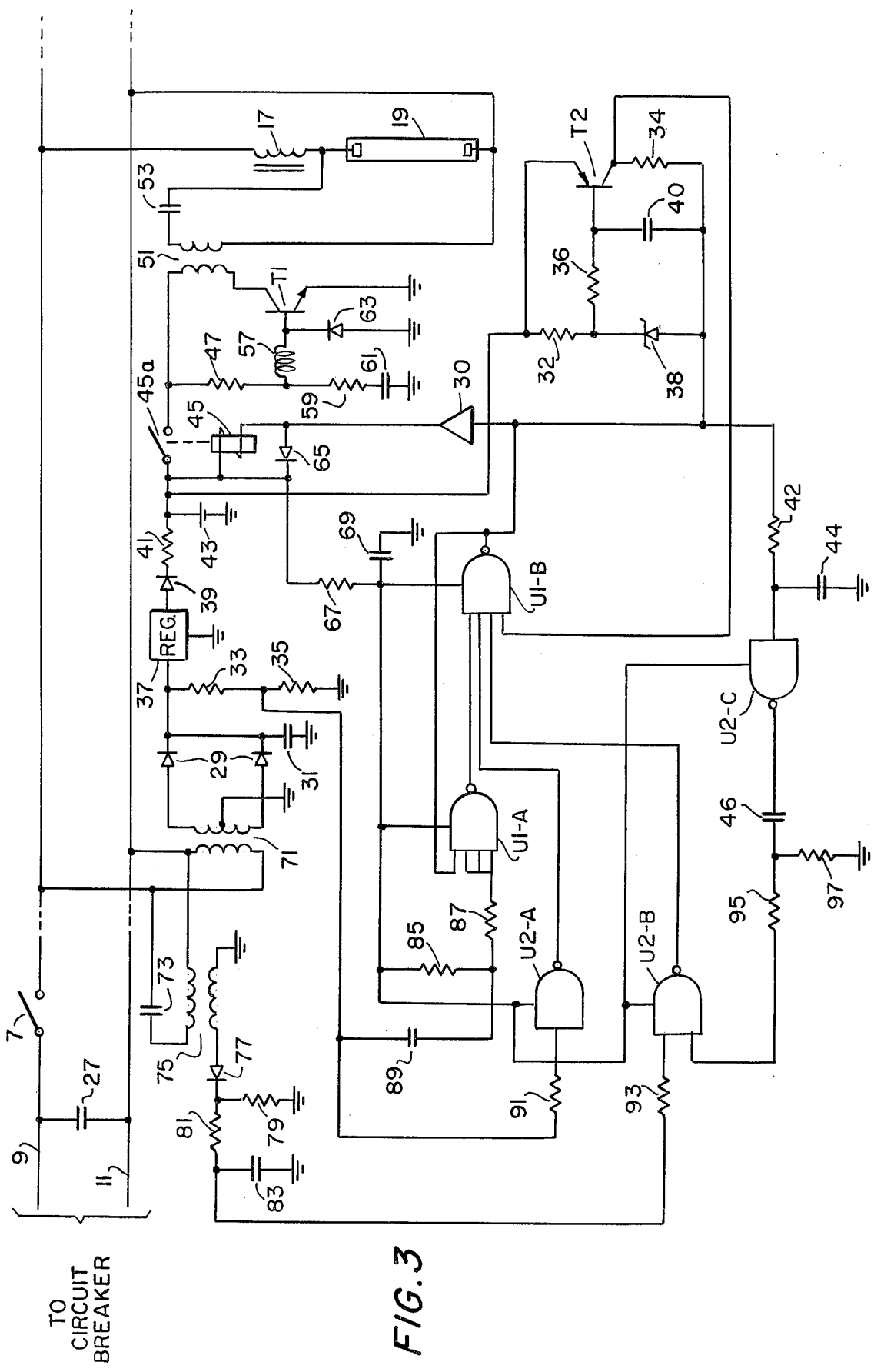
FIG. 3 is a detailed schematic of the illustrative embodiment of my invention.

A detailed schematic of the illustrative embodiment of the invention is depicted in FIG. 3. Transformer 71 is connected across line 9, 11 and its function, together with diodes 29 and capacitor 31, is to derive an unregulated DC potential for re-charging battery 43 when line power is present on the line. A conventional 15-volt voltage regulator 37 is used for deriving a constant potential for re-charging the battery. Resistor 41 limits the current furnished to the battery, and diode 37, as is known in the art, prevents discharge of the battery into the voltage regulator when line power is not present on the line.

The unregulated voltage across capacitor 31 also functions as the "loss-of-power" signal. Voltage divider 33, 35 serves to reduce the potential level which is actually used to trigger the flip-flop for controlling operation of the secondary power source. The signal at the junction of resistors 33 and 35 is equivalent to the potential at the output of AC detector 12 in FIG. 2.

The potential of battery 43 is extended through resistor 67 to the $V_{dd}$ (power) inputs of five gates used in the circuit. Capacitor 69 is a conventional de-coupling capacitor. The gates are powered by the battery so that their operations do not depend upon the presence of line power. All of the gates are contained on two CMOS chips so that there is minimal power drain. Chip U1 (a 4023 chip) contains two NAND gates A and B; as will be described below, these two gates comprise flip-flop 18 of FIG. 2. Chip U2 (a 4011 chip) includes three inverters A, B and C (with a fourth gate left over as a spare).

When the flip-flop U1 is set, its output is low. Buffer amplifier 30 extends a low potential to one end of the coil of relay 45 so that the relay energizes and closes its contacts 45a. Diode 65, connected across the relay coil, simply serves to dissipate the coil current when the relay de-energizes.

The active element in the DC-to-AC converter is transistor T1. The primary winding of transformer 51 and coil 57 are in phase with each other. Although any conventional DC-to-AC converter may be utilized, the circuit depicted in FIG. 3 is particularly advantageous. When contacts 45a are closed, the 12-volt potential of battery 43 is extended through resistor 47 and coil 57 to the base of transistor T1, and the transistor turns on and immediately saturates. As current flows, the core of transformer 51 saturates, and because of the feedback the transistor then turns off. When the energy in the transformer windings dissipates, the transistor turns on once again. The oscillations occur at a frequency of 25 kHz and with a duty cycle of 50% (a 50% duty cycle extends the life of fluorescent lamp 19). Resistor 47 is a starting resistor which allows oscillations to commence. Resistor 59 and capacitor 61 ensure that transistor T1 remains saturated while it conducts, despite variations in fluorescent lamp characteristics and variations in the transistor characteristics. Diode 63 protects transistor T1 from negative spikes applied to its base terminal.

The secondary winding of transformer 51 is connected through capacitor 53 across lamp 19. The capacitor serves as a ballast to drop any voltage not required by the lamp. The capacitor also serves to block the AC voltage from feeding back into the transformer under normal AC operation. The RMS voltage applied across the lamp terminals can vary anywhere between 60 and 100 volts, depending upon the particular lamp which is employed.

The low-battery sensor 8 of FIG. 2 is implemented by the circuit components associated with transistor T2. When the battery is being used to power the lamp, the output of gate U1-B is low. This potential is used as the "ground" for the circuit. The 12-volt battery potential is applied to the emitter of the transistor. As long as the battery potential is sufficiently high, Zener diode 38 conducts, and transistor T2 is forced to conduct because its emitter potential is higher than its base potential. Capacitor 40 is provided for transient immunity purposes. The transistor conducts and its collector terminal remains at the potential of battery 43. This high potential, which is extended to one input of gate U1-B, does not affect the output of the gate. But if the battery potential falls too low, the transistor stops conducting. The collector falls low in potential and the output of gate U1-B goes high. With a high potential now applied to the relay coil at the output of amplifier 30, the relay turns off so that further depletion of the battery charge is prevented.

After the unit is made and until it is installed, it is desirable not to drain the battery. Were the flip-flop set, with a low potential at the output of gate U1-B, current would flow through resistor 32 and Zener diode 38. Also, relay 45 would be energized, thus further draining the battery. For this reason, until the unit is installed, it is preferred that the output of gate U1-B be high in potential. Toward this end, after the unit is assembled in the factory, battery 43 should be disconnected momentarily. The various chips are still powered when the battery is disconnected because of the charge which remains on capacitor 69. But when the battery is disconnected from the circuit, ground potential is applied momentarily by a technician to one input of gate U1-B. This has the effect of resetting the flip-flop, with the output of gate U1-B going high. Thus until the unit is installed, no substantial current flows through either the low-battery sensor or the relay coil, even though the battery is connected.

The primary winding of transformer 75 is connected across line 9, 11 and serves to pass the 25-kHz signal which appears on the line as a result of the operation of the DC-to-AC converter. Decoupling capacitor 73 serves to prevent 60-Hz line power from being detected. By "tuning" transformer 75 to the 25-kHz signal, as described above, more reliable operation is ensured. The transformer functions as the impedance monitor. If switch 7 is open, then a high-level 25-kHz signal is detected and a high potential is applied to diode 77. On the other hand, if the switch is closed, capacitor 27 shorts the line and a low-level signal is applied to the anode of diode 77. The signal-level ratio may vary by as much as 100:1. Diode 77 rectifies the detected signal, and resistors 79 and 81, together with capacitor 83, function as an integrator for deriving a DC potential which is extended through resistor 93 to one input of gate U2-B. A high-level signal at this input represents an open-switch 7, while a low-level signal (low enough for causing the output of gate U2-B to go high) represents a true loss-of-power condition.

Gates U1-A and U1-B are arranged to function as a flip-flop, corresponding to flip-flop 18 of FIG. 2. Whenever the output of one of the gates goes low, because it is fed back to one of the inputs of the other gate, the output of this other gate is held high. Initially, the output of gate U1-B is high. This output is fed back to one input of gate U1-A. The three other inputs of this four-input gate are tied together and are connected through resistors 87, 85 to the $V_{dd}$ supply. Consequently, all inputs of gates U1-A are high, and the output remains low in order to hold the output of gate U1-B high. The flip-flop is thus reset, but it can be set with the application of a low potential to the junction of resistors 85, 87. In such a case, the output of gate U1-A goes high and, with the other three inputs of gate U1-B high, its output goes low; the low potential at the output of gate U1-B not only holds the output of gate U1-A high, but it also controls energization of relay 45. The flip-flop is reset when a low potential is applied to any one of the three lower inputs of gate U1-B.

It should be noted that while the block diagram of FIG. 2 employs positive logic, the actual circuit implementation of FIG. 3 employs negative logic. In FIG. 2, it is a positive potential at the Q output of flip-flop 18 which controls energization of relay 45, and it is positive steps at the S and R inputs which control triggering of the flip-flop. But in the circuit of FIG. 3, it is a low potential at the flip-flop output (output of gate U1-B) which controls energization of relay 45, and the triggering potentials are all low. The reason for this is that it eliminates the need for OR gate 28 on FIG. 2. Simply by coupling the three inputs which reset flip-flop 18 of FIG. 2 to the inputs of gates U1-B on FIG. 3, it is possible to reset the flip-flop of FIG. 3 by any one of three different low-level signals.

The flip-flop is set, as described above, by a low potential being extended through resistor 87 to the three inputs of gates U1-A which are tied together. The potential at the junction of resistors 33 and 35 goes low when a loss of power is detected. The negative step is extended through capacitor 89 and resistor 87 to set the flip-flop. Capacitor 89 then charges so as to allow the potential extended through resistor 87 to rise, the capacitor charging from source $V_{dd}$ through resistor 85. This ensures that the lower three inputs of gates U1-A are held high so that the AC detector (block 12 in FIG. 2, and the junction of resistors 33, 35 in FIG. 3) does not hold the flip-flop in the set state. By employing negative logic in the actual circuit, it is apparent that there is no need for inverter 14 of FIG. 2.

The first reset signal for the flip-flop on FIG. 2 is that derived at the output of AC detector 12; when power is restored to the line, the flip-flop should be reset. The potential at the junction of resistors 33 and 35 on FIG. 3 is extended through resistor 91 to the input of gate U2-A. When power is restored, the output of the gate goes low. Since the gate output is connected to one of the inputs of gate U1-B, the flip-flop is reset. A second input for resetting the flip-flop is derived from the low battery sensor, at the collector of transistor T2. As described above, when the battery potential falls too low, transistor T2 turns off and the low potential at its collector resets the flip-flop.

The third input for resetting the flip-flop is derived from the impedance monitor/integrator, at the junction of resistor 81 and capacitor 83. This signal is high if switch 7 is open, and it is extended through resistor 93 to one input of gate U2-B. When the other input of the gate goes high, the output goes low to reset the flip-flop. The lower input of gate U2-B is caused to go high for only one second, after one second has elapsed following a loss of power on the line. If switch 7 is closed at this time, the potential extended through resistor 93 is low, the output of gate U2-B remains high, and the flip-flop is not reset.

The components associated with gate U2-C comprise delay 6 and one-shot multivibrator 26 of FIG. 2 (with NAND gate U2-B corresponding to gate 24 on FIG. 2). When a loss of power is first detected, the output of gate U1-B goes low. Prior to this time, while the flip-flop is reset, the output of gate U1-B is high and capacitor 44 is charged to hold the input of gate U2-B high. When the output of gate U1-B goes low, capacitor 44 discharges through resistor 42. It requires approximately one second before the potential across capacitor 44 drops to a level which causes the output of gate U2-C to go high. This is the high potential which enables gate U2-B.

The positive step at the output of gate U2-C is transmitted through capacitor 46 and resistor 95 to enable gate U2-B. But the capacitor 46 then starts to charge through resistor 97. Approximately one second after the output of gate U2-C first goes high, the capacitor has charged to the point at which the left side of the capacitor is at a low enough potential to disable gate U2-B. At this time, the output of gate U2-B goes high. Consequently, gate U2-B is enabled to operate for only one second, starting with one second after the loss-of-power condition is first detected. Neither one-second time period is critical. At least one second is preferred for allowing line transients to dissipate. In most cases, there should be no need for increasing the delay (during which time the battery is powering the lamp when there may be no need for it). Similarly, to extend the "window" during which the line condition controls whether the flip-flop is reset can lead to erroneous operation if noise is on the line—even with switch 7 closed, a noise spike may result in a sufficient potential being extended through resistor 93 for resetting the flip-flop, even though emergency lighting may be required.

The circuit of FIG. 3 has been described as though the emergency light fixture is the only one connected across lines 9, 11. But with reference to FIG. 1, it will be recalled that there are usually other fixtures connected across the line. Thus the signal level detected by the impedance monitor is not determined exclusively by capacitor 27 and switch 7. But it can be shown that the presence of other fixtures on the line has little effect on the circuit operation.

Assume for the moment that there are no other fixtures on the line, that impedances on the line to the left of capacitor 27 may be ignored, and that the DC-to-AC converter applies a 100-volt signal across lamp 19 in FIG. 3. If $Z_C$ is the impedance of capacitor 27 at 25 kHz, and $Z_L$ is the impedance at 25 kHz of ballast 17, then with switch 7 closed the potential $V_L$ across the line is determined by the following simple voltage-divider relationship:

$$V_L = 100(Z_C)/(Z_C+Z_L).$$

Because $Z_C$ is much lower in magnitude than $Z_L$, $V_L$ is quite low when switch 7 is closed. If there are additional fixtures connected to the line, the term $Z_L$ in the above equation is smaller in magnitude since it then represents the impedances of all of the fixtures connected in parallel. But because each fixture impedance includes a ballast impedance of a few kilohms plus a lamp impedance (which is very high when the lamp is off), the $Z_L$ term is still much greater in magnitude than $Z_C$ so $V_L$ is very small in magnitude. On the other hand, if switch 7 is open, then without any other fixtures on the line, the line is in effect an open circuit and the full 100 volts of the DC-to-AC convertor appears across the line. The presence of additional fixtures on the line will cause less than the full 100 volts to appear on the line, but the potential will still be high enough to allow discrimination between the open-switch and closed-switch conditions.

Capacitor 27 functions to control the level of the 25-kHz signal on the line so as to determine whether switch 7 is open or closed. But it also serves in two other capacities. There may be other emergency lighting systems on other lines, whose detectors also respond to 25-kHz signals. It is desirable in such a case to prevent the signal of one fixture from appearing on the line of another. This is accomplished by capacitor 27 which shorts the signal and prevents its transmission to the left. (If two emergency lighting systsms are connected on the same line i.e., to the right of switch 7, then two 25-kHz signals will appear on the same line. Because of the very great difference in the impedance levels seen looking to the left into switch 7, depending upon whether the switch is open or closed, each of the two impedance monitors will still be able to distinguish between the two conditions. (It is only if the two 25-kHz signals are exactly out of phase with each other and if they have identical frequencies that a low-level signal will appear on the line when a high-level signal should appear instead. But even in this rare case, all that happens is that both emergency lamps stay on rather than being turned off.) The other purpose served by capacitor 27 relates to systems which use the power lines for communication purposes. Typically, control signals at a frequency of 180 kHz may be transmitted throughout a building for controlling different functions. It is desirable that the fixtures be isolated from these control signals, and capacitor 27 does precisely this by shorting them across the line.

In the illustrative embodiment of the invention, it is a capacitor connected across the line, on that side of the switch opposite to the side to which the emergency lighting system is connected, which allows discrimination between open-switch and closed-switch conditions. But other arrangements are possible. For example, instead of using a passive impedance element, a line-powered active signal generator connected across the switch may be used. One advantage of this approach is that it may not be necessary to wait for line transients to dissipate before examining whether the level of the signal from the generator is present on the line. it is also possible to utilize passive components placed across the switch. In such a case, a varistor or dual Zener diode arrangement may be incorporated in the line to prevent the full line voltage from appearing across a fixture when the switch is open, in order to protect any persons working on the fixtures.

Still another possibility is to provide an autotransformer across the line on the left side of the switch. In such a case, a three-way switch may be used; when the switch is "open", the movable contact is connected to an intermediate point on the coil. Thus full line voltage will be seen when the switch is closed, and only a reduced voltage will be seen when the switch is open, one again allowing discrimination between the two cases.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A system for controlling the operation of an emergency device connected to a power line having a switch therein comprising a secondary power source for powering said emergency device, means for detecting a first loss-of-power condition resulting from the opening of said switch and a second loss-of-power condition resulting from a line failure even when said switch is closed, means responsive to the detection only of said second condition for enabling the continued powering of said emergency device from said secondary power source, said secondary power source, said detecting means and said enabling means all being contained at the location of said emergency device, control means for initially causing said emergency device to be powered from said secondary power source immediately responsive to the loss of power on said power line, and means for controlling said enabling means to operate only a predetermined time interval after said loss of power.

2. A system in accordance with claim 1 wherein said detecting means operates to control said enabling means for only a brief time period following said predetermined time interval, said enabling means therafter continuing to operate for an extended time interval independent of said detecting means.

3. A system in accordance with claim 2 wherein said emergency device is a fluorescent lamp and said secondary power source is a battery-operated DC-to-AC converter for powering said lamp, and wherein said predetermined time interval is sufficient to allow transients on said power line to dissipate such that said detecting means can correctly detect the condition of said line.

4. A system in accordance with claim 3 wherein said secondary power source is capable of sustaining operation of said fluorescent lamp but not initiating operation thereof, and said control means causes said fluorescent lamp to be powered from said DC-to-AC converter during said predetermined time interval.

5. A system in accordance with claim 4 further including impedance means connected across said line on the side of said switch remote from said emergency device, and wherein said detecting means operates in accordance with the impedance seen looking into said impedance means through said switch.

6. A system in accordance with claim 5 wherein said DC-to-AC converter operates at a frequency much higher than the line frequency and applies a signal at said higher frequency to said line, and said detecting means is tuned to said higher frequency for operating in accordance with the impedance seen looking into said impedance means at said higher frequency.

7. A system in accordance with claim 6 further including means for sensing a low-battery-charge state of said secondary power source and in response thereto for causing said enabling means to cease enabling the continued powering of said emergency device from said secondary power source.

8. A system in accordance with claim 7 further including means responsive to the appearance of power on said line for causing said enabling means to cease enabling the continued powering of said emergency device from said secondary power souce.

9. A system in accordance with claim 1 further including impedance means connected across said line on the side of said switch remote from said emergency device, and wherein said detecting means operates in accordance with the impedance seen looking into said impedance means through said switch.

10. A system in accordance with claim 9 wherein said secondary power source operates at a frequency much higher than the line frequency and applies a signal at said higher frequency to said line, and said detecting means is tuned to said higher frequency for operating in accordance with the impedance seen looking into said impedance means at said higher frequency.

11. A system in accordance with claim 1 further including means for sensing a low-charge state of said secondary power source and in response thereto for causing said enabling means to cease enabling the continued powering of said emergency device from said secondary power source.

12. A system in accordance with claim 1 further including means responsive to the appearance of power on said line for causing said enabling means to cease enabling the continued powering of said emergency device from said secondary power source.

13. A system in accordance with claim 12 wherein said emergency device is a fluorescent lamp and said secondary power source is a battery-operated DC-to-AC converter for powering said lamp, and wherein said predetermined time interval is sufficient to allow transients on said power line to dissipate such that said detecting means can correctly detect the condition of said line.

14. A system in accordance with claim 1 wherein said secondary poer souce is capable of sustaining operation of said fluorescent lamp but not initiating operation thereof, and said control means causes said fluorescent lamp to be powered from said DC-to-AC converter during said predetermined time interval.

15. A system in accordance with claim 1 wherein said secondary power source operates at a frequency much higher than the line frequency and applies a signal at said higher frequency to said line, and said detecting means is tuned to said higher frequency for operating in accordance with the impedance seen looking into said impedance means at said higher frequency.

16. A system in accordance with claim 15 further including means for sensing a low-charge state of said secondary power source and in response thereto for causing said enabling means to cease enabling the continued powering of said emergency device from said secondary power source.

17. A system in accordance with claim 16 further including means responsive to the appearance of power on said line for causing said enabling means to cease enabling the continued powering of said emergency device from said secondary power source.

18. A system in accordance with claim 1 wherein said emergency device is a fluorescent lamp and said secondary power source is a battery-operated DC-to-AC converter for powering said lamp, and wherein said enabling means responds to said detecting means only after transients on said power line have dissipated following a line failure.

19. A system in accordance with claim 18 wherein said secondary power source is capable of sustaining operation of said fluorescent lamp but not initiating operation thereof, and further including means for causing said fluorescent lamp to be powered from said DC-to-AC converter until after said transients have dissipated.

20. A system in accordance with claim 1 further including means connected to said line for cooperating with said detecting means to cause said detecting means to operate differently depending upon whether said switch is open or closed when there is a loss-of-power condition.

21. A system in accordance with claim 1 further including means for applying to said power line a signal having a frequency much higher than the line frequency, the level of the signal at said higher frequency which is detected by said detecting menas being a function of whether said switch is open or closed, and wherein said detecting means is tuned to said higher frequency and operates in accordance with the level of the signal at said higher frequency which it detects.

22. A system for controlling the operation of a particular one of a plurality of lights connected to a power line having a switch therein comprising a secondary power source for powering said light, means operative only when said switch is closed for detecting a loss of power on said line, means responsive to the operation of said detecting means for controlling the subsequent powering of said light from said secondary power source, said secondary power source, said detecting means and said controlling means all being contained at the location of said light, and impedance means connected across said line on the side of said switch remote from said light, and wherein said detecting means operates in accordance with the impedance seen looking into said impedance means through said switch.

23. A system in accordance with claim 22 wherein said secondary power source operates at a frequency much higher than the line frequency and applies a signal at said higher frequency to said line, and said detecting means is tuned to said higher frequency for operating in accordance with the impedance seen looking into said impedance means at said higher frequency.

24. A system in accordance with claim 23 further including means for sensing a low-charge state of said secondary power source and in response thereto for causing said controlling means to cease controlling the subsequent powering of said light from said secondary power source.

25. A system in accordance with claim 23 further including means responsive to the appearance of power on said line for causing said controlling means to cease controlling the subsequent powering of said light from said secondary power source.

26. A system in accordance with claim 22 further including means for initially causing said light to be powered from said secondary power source immediately responsive to the loss of power on said power line, and means for allowing said controlling means to operate only a predetermined time interval after said loss of power.

27. A system in accordance with claim 26 wherein said controlling means responds to said detecting means for only a brief time period following said predetermined time interval, said controlling means thereafter continuing to operate for an extended time interval independent of said detecting means.

28. A system in accordance with claim 27 wherein said light is a fluorescent lamp and said secondary power source is a battery-operated DC-to-AC converter for powering said lamp, and wherein said predetermined time interval is sufficient to allow transients on said power line to dissipate such that said detecting means can operate reliably.

29. A system in accordance with claim 28 wherein said secondary power source is capable of sustaining operation of said fluorescent lamp but not initiating operation thereof, and said initially causing means causes said fluorescent lamp to be powered from said DC-to-AC converter during said predetermined time interval.

30. A system in accordance with claim 22 further including means for sensing a low-charge state of said secondary power source and in response thereto for causing said controlling means to cease controlling the subsequent powering of said light from said secondary power source.

31. A system in accordance with claim 22 further including means responsive to the appearance of power on said line for causing said controlling means to cease controlling the subsequent powering of said light from said secondary power source.

32. A system in accordance with claim 22 wherein said light is a fluorescent lamp and said secondary power source is a battery-operated DC-to-AC converter for powering said lamp, and wherein said controlling means responds to said detecting means only after transients on said power line have dissipated following a loss of power on said line.

33. A system in accordance with claim 32 wherein said secondary power source is capable of sustaining operation of said fluorescent lamp but not initiating operation thereof, and further including means for causing said fluorescent lamp to be powered from said DC-to-AC converter until after said transients have dissipated.

34. A system in accordance with claim 22 further including means connected to said line for cooperating with said detecting means to cause said detecting means to operate differently depending upon whether said switch is open or closed when there is a loss of power on said line.

35. A system in accordance with claim 22 further including means for applying to said power line a signal having a frequency much higher than the line frequency, the level of the signal at said higher frequency which is detected by said detecting means being a function of whether said switch is open or closed, and wherein said detecting means is tuned to said higher frequency and operates in accordance with the level of the signal at said higher frequency which it detects.

36. A system for controlling the operation of a light connected to a power line having a switch therein comprising a secondary power source for powering said light, means responsive to a loss of power on said line for controlling said secondary power source to power said light, means for detecting an open condition in said switch for inhibiting the operation of said controlling means, said secondary power source, said controlling means and said inhibiting means all being contained at the location of said light, and impedance means connected across said line on the side of said switch remote from said light, and wherein said inhibiting means operates in accordance with the impedance seen looking into said impedance means through said switch.

37. A system in accordance with claim 36 wherein said secondary power source operates at a frequency much higher than the line frequency and applies a signal at said higher frequency to said line, and said inhibiting means is tuned to said higher frequency for operating in accordance with the impedance seen looking into said impedance means at said higher frequency.

38. A system in accordance with claim 37 further including means responsive to the appearance of power on said line for causing said controlling means to cease controlling the powering of said light from said secondary power source.

39. A system in accordance with claim 36 wherein said controlling means initially controls said light to be powered from said secondary power source immediately responsive to the loss of power on said power line, and said inhibiting means is operative only a predetermined time interval after said loss of power.

40. A system in accordance with claim 39 wherein said inhibiting means first operates only during a brief time period following said predetermined time interval, said inhibiting means thereafter continuing to operate for an extended time interval independent of the condition of said switch.

41. A system in accordance with claim 40 wherein said light is a fluorescent lamp and said secondary power source is a battery-operated DC-to-AC converter for powering said lamp, and wherein said predetermined time interval is sufficient to allow transients on said power line to dissipate such that said inhibiting means can operate reliably.

42. A system in accordance with claim 41 wherein said secondary power source is capable of sustaining operation of said fluorescent lamp but not initiating operation thereof.

43. A system in accordance with claim 36 further including means for sensing a low-charge state of said secondary power source and in response thereto for causing said controlling means to cease controlling the powering of said light from said secondary power source.

44. A system in accordance with claim 36 further including means responsive to the appearance of power on said line for causing said controlling means to cease controlling the powering of said light from said secondary power source.

45. A system in accordance with claim 36 wherein said light is a fluorescent lamp and said secondary power source is a battery-operated DC-to-AC converter for powering said lamp, and wherein said inhibiting means first operates only after transients on said power line have dissipated following a loss of power on said line.

46. A system in accordance with claim 45 wherein said secondary power source is capable of sustaining operation of said fluorescent lamp but not initiating operation thereof, and wherein said controlling means controls said fluorescent lamp to the powered from said DC-to-AC converter until after said transients have dissipated.

47. A system in accordance with claim 36 further including means connected to said line for cooperating with said inhibiting means to cause said inhibiting means to operate differently depending upon whether said switch is open or closed when there is a loss of power on said line.

48. A system in accordance with claim 36 further including means for applying to said power line a signal having a frequency much higher than the line frequency, the level of the signal at said higher frequency being detected by said inhibiting means and being a function of whether said switch is open or closed, and wherein said inhibiting means is tuned to said higher frequency and operates in accordance with the level of the signal at said higher frequency which it detects.

* * * * *